(12) United States Patent
Venkataraman et al.

(10) Patent No.: US 9,148,364 B2
(45) Date of Patent: Sep. 29, 2015

(54) SYSTEM, METHOD AND APPARATUS FOR EFFICIENT MANAGEMENT OF S-PMSI RESOURCE IN RSVP P2MP MULTICAST NETWORKS

(71) Applicant: ALCATEL LUCENT USA, INC., Murray Hill, NJ (US)

(72) Inventors: Srikrishnan Venkataraman, Sunnyvale, CA (US); Pradeep Jain, Sunnyvale, CA (US); Geetha Rema Devi, Sunnyvale, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/041,851

(22) Filed: Sep. 30, 2013

(65) Prior Publication Data

US 2015/0092569 A1 Apr. 2, 2015

(51) Int. Cl.
| | |
|---|---|
| G01R 31/08 | (2006.01) |
| H04L 12/761 | (2013.01) |
| H04L 12/803 | (2013.01) |
| H04L 12/723 | (2013.01) |
| H04L 12/729 | (2013.01) |
| H04L 12/801 | (2013.01) |
| H04L 12/913 | (2013.01) |
| H04L 12/715 | (2013.01) |
| H04L 12/26 | (2006.01) |
| H04L 12/721 | (2013.01) |

(52) U.S. Cl.
CPC .............. *H04L 45/16* (2013.01); *H04L 43/16* (2013.01); *H04L 45/04* (2013.01); *H04L 45/124* (2013.01); *H04L 45/125* (2013.01); *H04L 45/50* (2013.01); *H04L 47/125* (2013.01); *H04L 47/35* (2013.01); *H04L 47/724* (2013.01)

(58) Field of Classification Search
CPC ....................................................... H04L 12/56
USPC ........... 370/389–392, 401–412; 709/220–223
See application file for complete search history.

(56) References Cited

U.S. PATENT DOCUMENTS

| | | | | |
|---|---|---|---|---|
| 2010/0177752 | A1* | 7/2010 | Aggarwal et al. | 370/338 |
| 2013/0322291 | A1* | 12/2013 | Venkataraman et al. | 370/254 |
| 2014/0029419 | A1* | 1/2014 | Jain et al. | 370/228 |

OTHER PUBLICATIONS

E.Rosen, Ed.;R. Aggarwal, Ed.; Internet Engineering Task Force(IETF) RFC 6513; Standards Track; Multicast in MPLS/BGP IP VPN's; pp. 1-88; Feb. 2012.

* cited by examiner

*Primary Examiner* — Iqbal Zaidi
(74) *Attorney, Agent, or Firm* — Kramer & Amado, P.C.

(57) ABSTRACT

A method, apparatus, and machine readable storage medium is for management of an Inclusive Provider Multicast Service Interface (I-PMSI) tunnel for forwarding traffic for a given multicast flow is disclosed. Aspects of the method comprise: upon expiry of an S-PMSI_DELAY interval timer, switching the multicast flow from the I-PMSI tunnel to a Selective Provider Multicast Service Interface (S-PMSI) tunnel only if the number of active Source-to-Leaf (S2L) paths exceeds a defined first threshold of a number of S2L paths and otherwise resetting the S-PMSI_DELAY interval timer. Other aspects provide for switching the multicast flow from the I-PMSI tunnel to the S-PMSI tunnel only if the number of PE nodes associated with the S-PMSI tunnel interested in the multicast flow does not exceed a defined a second threshold. Other aspects, in the case of the S-PMSI tunnel being active, further comprise steps of switching the multicast flow from the S-PMSI tunnel to the I-PMSI tunnel if the number of S2L paths on S-PMSI in bypass exceeds a third defined threshold.

17 Claims, 4 Drawing Sheets

US 9,148,364 B2

SYSTEM, METHOD AND APPARATUS FOR EFFICIENT MANAGEMENT OF S-PMSI RESOURCE IN RSVP P2MP MULTICAST NETWORKS

CROSS REFERENCE TO RELATED APPLICATIONS

This application cross-references co-pending U.S. patent application Ser. No. 13/623,172, filed Sep. 20, 2012, and entitled "SYSTEM AND METHOD FOR EFFICIENT MVPN SOURCE REDUNDANCY WITH S-PMSI", which application is incorporated by reference in its entirety for all purposes.

FIELD OF INVENTION

The invention relates to the field of communication networks, and more specifically but not exclusively, to traffic path management in communication networks supporting multicast services.

BACKGROUND

Multiprotocol Label Switching (MPLS) enables efficient delivery of a wide variety of differentiated, end to end services. Multiprotocol Label Switching (MPLS) traffic engineering (TE) provides a mechanism for selecting efficient paths across an MPLS network based on bandwidth considerations and administrative rules.

In current implementations of Multicast Virtual Private Networks (MVPN) with Resource Reservation Protocol (RSVP) Point-to-Multipoint (P2MP), switching from Inclusive Provider Multicast Service Interface (I-PMSI) to Selective Provider Multicast Service Interface (S-PMSI) typically happens after a predefined switch-over delay interval (S-PMSI_DELAY as described in Internet Engineering Task Force (IETF) Request for Comment (RFC) 6513, hereby incorporated by reference) which does not ensure that all Source-to-Leaf (S2L) paths in the S-PMSI P2MP LSP are up before the switchover. This can lead to traffic loss for receiving Provider Edge (PE) routers having S2L paths which took a longer time to establish than the switch-over delay interval.

Secondly, if S-PMSI configuration is enabled then new S-PMSI P2MP LSPs will be signaled if all PE routers participating in the MVPN have active receivers. This causes extra states in the network core with no bandwidth conservation, which is generally considered the purpose of S-PMSI.

Therefore, improvements to management of S-PMSI resources are highly desirable.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for management of an Inclusive Provider Multicast Service Interface (I-PMSI) tunnel for forwarding traffic for a given multicast flow. The method comprises steps of: defining a first threshold of a number of Source-to-Leaf (S2L) paths; receiving an indication of an S-PMSI_DELAY interval timer expiry; determining a number of active S2L paths within the I-PMSI tunnel; and upon receiving the indication, determining if the number of active S2L paths exceeds the first threshold; if the number of active S2L paths exceeds the first threshold then switching the multicast flow from the Inclusive Provider Multicast Service Interface (I-PMSI) tunnel to a Selective Provider Multicast Service Interface (S-PMSI) tunnel; and if the number of active S2L paths does not exceed the first threshold, then resetting the S-PMSI_DELAY interval timer.

Other exemplary embodiments further comprise steps of: defining a second threshold of a number of interested Provider Edge (PE) nodes; monitoring the number of PE nodes associated with the S-PMSI tunnel interested in the multicast flow (interested PE nodes); determining if the number of interested PE nodes exceeds the second threshold; if the number of interested PE nodes does not exceed the second threshold, then switching the multicast flow from the I-PMSI tunnel to the S-PMSI tunnel; and if the number of interested PE nodes exceeds the second threshold, then not switching the multicast flow from the I-PMSI tunnel to the S-PMSI tunnel but instead, tearing down the S-PMSI tunnel.

Other exemplary embodiments, in the case of the S-PMSI tunnel being active, further comprise steps of: defining a third threshold of a number of S2Ls in bypass; monitoring the number of S2L paths on S-PMSI in bypass while the I-PMSI is up; and switching the multicast flow from the S-PMSI tunnel to the I-PMSI tunnel if the number of S2L paths on S-PMSI in bypass exceeds the third threshold.

In various embodiments the number of active S2L paths and the first threshold represent numbers relative to a total number of S2L paths within the I-PMSI tunnel.

In various embodiments the network device comprises a Provider Edge Label Switch Router (PE-LSR).

In various embodiments the S2L paths comprise S2L Label Switched Paths (LSPs).

Various other exemplary embodiments relate to a network device for handling multicast flows. The network device comprises: a network interface; and a processor in communication with the network interface, wherein the processor is configured to: define a first threshold of a number of Source-to-Leaf (S2L) paths; receive an indication of an S-PMSI_DELAY interval timer expiry; determine a number of active S2L paths within the I-PMSI tunnel; determine if the number of active S2L paths exceeds the first threshold; if the number of active S2L paths exceeds the first threshold then switch the multicast flow from the Inclusive Provider Multicast Service Interface (I-PMSI) tunnel to a Selective Provider Multicast Service Interface (S-PMSI) tunnel; and if the number of active S2L paths does not exceed the first threshold then reset the S-PMSI_DELAY interval timer.

In other exemplary embodiments the network device is further configured to: define a second threshold of a number of interested Provider Edge (PE) nodes; determine the number of PE nodes associated with the S-PMSI tunnel interested in the multicast flow (interested PE nodes); determine if the number of interested PE nodes exceeds the second threshold; if the number of interested PE nodes does not exceed the second threshold, then switch the multicast flow from the I-PMSI tunnel to the S-PMSI tunnel; and if the number of interested PE nodes exceeds the second threshold, then not switch the multicast flow from the I-PMSI tunnel to the S-PMSI tunnel but instead, tear down the S-PMSI tunnel.

In other exemplary embodiments the network device, in the case of the S-PMSI tunnel being active, is further configured to: define a third threshold of a number of S2Ls in bypass; monitor the number of S2L paths on S-PMSI in bypass while the I-PMSI is up; and switch the multicast flow from the S-PMSI tunnel to the I-PMSI tunnel if the number of S2L paths on S-PMSI in bypass exceeds the third threshold.

Various other exemplary embodiments relate to a tangible and non-transitory machine-readable storage medium encoded with instructions thereon for execution by a network device, wherein the tangible and non-transitory machine-readable storage medium comprises instructions for: defining a first threshold of a number of Source-to-Leaf (S2L) paths; receiving an indication of an S-PMSI_DELAY interval expiry; determining a number of active S2L paths within the I-PMSI tunnel; upon receiving the indication, determining if the number of active S2L paths exceeds the first threshold; if the number of active S2L paths exceeds the first threshold then switching the multicast flow from the Inclusive Provider Multicast Service Interface (I-PMSI) tunnel to a Selective Provider Multicast Service Interface (S-PMSI) tunnel; and if the number of active S2L paths does not exceed the first threshold, then resetting the S-PMSI_DELAY interval timer.

In other exemplary embodiments the tangible and non-transitory machine-readable storage medium of claim 14, further comprises instructions for: defining a second threshold of a number of interested Provider Edge (PE) nodes; determining the number of PE nodes associated with the S-PMSI tunnel interested in the multicast flow (interested PE nodes); determining if the number of interested PE nodes exceeds the second threshold; if the number of interested PE nodes does not exceed the second threshold, then switching the multicast flow from the I-PMSI tunnel to the S-PMSI tunnel; and if the number of interested PE nodes exceeds the second threshold, then not switching the multicast flow from the I-PMSI tunnel to the S-PMSI tunnel but instead, tearing down the 5-PMSI tunnel.

In other exemplary embodiments the tangible and non-transitory machine-readable storage medium of claim 14, in the case of the S-PMSI tunnel being active, further comprises instructions for: defining a third threshold of a number of S2Ls in bypass; monitoring the number of S2L paths on S-PMSI in bypass while the I-PMSI is up; and switching the multicast flow from the S-PMSI tunnel to the I-PMSI tunnel if the number of S2L paths on S-PMSI in bypass exceeds the third threshold.

BRIEF DESCRIPTION OF THE FIGURES

Some embodiments of apparatus and/or methods in accordance with embodiments of the present invention are now described, by way of example only, and with reference to the accompanying drawings in which.

DETAILED DESCRIPTION

Figure 1:
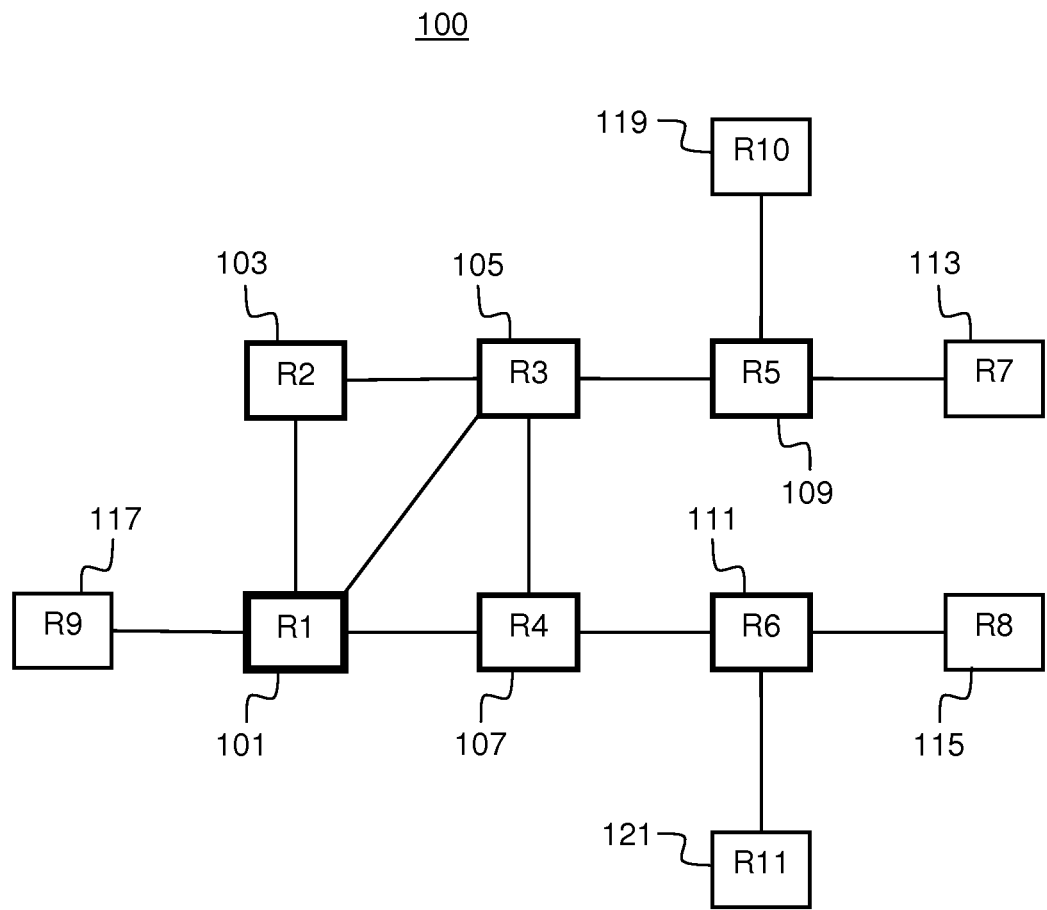
FIG. 1 illustrates a high level block diagram of a system benefiting from various embodiments.

Referring now to the drawings, in which like numerals refer to like components or steps, there are disclosed broad aspects of various exemplary embodiments.

In use the invention is situated in a piece of network equipment which acts as a node in a network of network equipment. In operation the network elements communicate via connections which bind the individual network element to other network elements to form the overall network.

FIG. 1 illustrates a high level block diagram of a communication network 100 providing a Multi Protocol Label Switching (MPLS) supporting Resource Reservation Protocol (RSVP) Inter Domain Traffic Engineering Label Switched Paths (TE LSPs). Root node 101 is a source provider edge (PE) router and is interconnected with bud nodes 103, 105, 107, 109, 111, via a plurality of communication links, and further interconnected through the bud nodes to leaf nodes 113, 115, 117, 119, 121. For the purposes of the following description, node 101 can be considered a network device acting as source node for MPLS traffic carried on I-PMSI or S-PMSI tunnels directed to one or more of leaf nodes 113, 115, 117, 119, 121.

Figure 2:
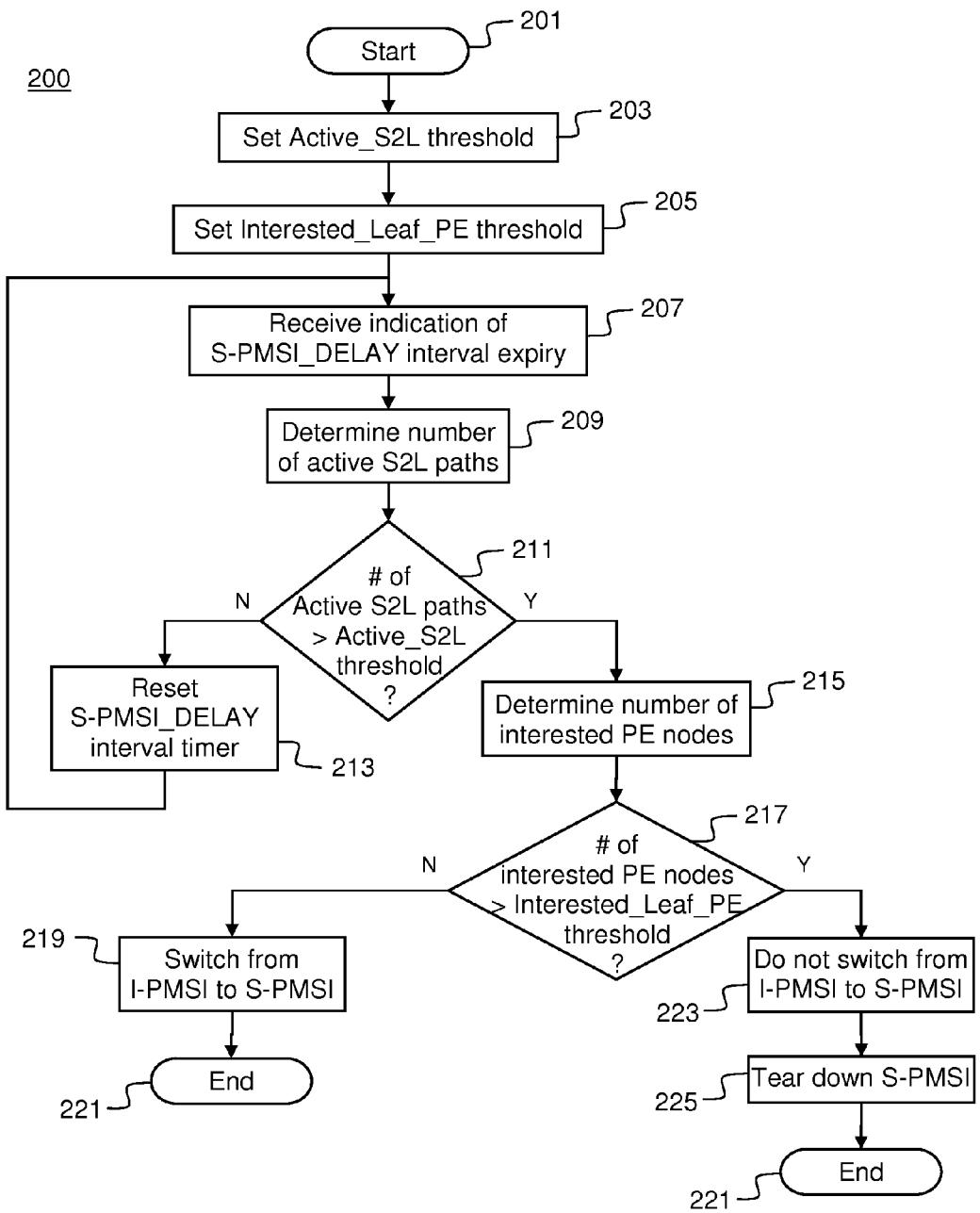
FIG. 2 illustrates a flow diagram of a method according to one embodiment.

FIG. 2 illustrates a flow diagram of a method according to one embodiment. Specifically, FIG. 2 depicts a method for execution by a network device such as a Provider Edge Label Switch Router (PE-LSR) (or "PE router") for controlling the switchover from I-PMSI to S-PMSI, and from S-PMSI to I-PMSI, using configurable thresholds. The method starts a step 201. At step 203, the network device sets a first configurable threshold "Active_S2L" for controlling the switchover from I-PMSI to S-PMSI, and which represents a threshold of a number of active S2L paths within an S-PMSI tunnel. This configurable threshold can be set through provisioning tools such as an Operations, Administration and Maintenance (OAM) tool or through a user interface, or pre-populated through software configuration. The OAM tool can operate on the network device directly or centrally through a network management system.

At step 205, the network device sets a second configurable threshold "Interested_Leaf_PE" for controlling switchover from S-PMSI to I-PMSI and which represents a threshold of a number of PE nodes associated with a S-PMSI tunnel and interested in the multicast flow (interested PE nodes).

At step 207, the network device receives indication of an S-PMSI_DELAY interval expiry. This would typically be in a situation where an I-PMSI tunnel is configured and active, and a PE router has sent an S-PMSI Join message, requesting a switch from I-PMSI to S-PMSI. Per RFC 6513, the S-PMSI_DELAY interval defines the delay time before the PE router should start transmitting onto the S-PMSI. The default value for S-PMSI_DELAY is typically 3 seconds. In embodiments of the present invention, additional criteria are evaluated before the switchover.

At step 209, the network device determines the number of active S2L paths on the configured S-PMSI tunnel. The number of active S2L paths can be measure in absolute numbers or as a number or percentage relative to the number of S2L paths that were active in the I-PMSI tunnel.

At step 211, the network device compares the number of active S2L paths to the previously defined "Active_S2L" configurable threshold and if number of active S2L paths is not greater than the "Active_S2L" threshold, the process continues to step 213, where the network device does not start using the S-PMSI tunnel yet, but instead, resets the S-PMSI_DELAY interval timer, to allow more time for additional S2L paths to become active. The process then loops back to step 207.

If at step 211, the network device determines that number of active S2L paths is greater than the Active_S2L threshold, the process continues to step 215, where the network device determines the number of PE nodes interested in a given multicast flow ("interested PE nodes").

In some embodiments, step 215 could be executed on a regular or recurring basis as a monitoring step.

At step 217, the network device compares the number of PE nodes interested in a given multicast flow path to the configurable threshold "Interested_Leaf_PE" previously defined at step 205 and if number of PE nodes interested in a given multicast flow path is not greater than the "Interested_Leaf_PE" threshold, the process continues to step 219, where the network device switches the multicast flow from I-PMSI to S-PMSI and starts using the S-PMSI tunnel. The process then ends at step 221.

If at step 217, the network device determines that the number of PE nodes interested in a given multicast flow path is greater than the "Interested_Leaf_PE" threshold, the process continues to step 223, where the network device does not start using the S-PMSI tunnel. In this situation, the bandwidth conservation advantage of using S-PMSI tunnels, by limiting traffic to only those PE nodes interested in a given multicast flow path could be out-weighed by the extra overhead of maintaining multiple S-PMSI tunnels instead of a single I-PMSI tunnel. At step 225, the network device tears down the S-PMSI tunnel. The process then ends at step 221.

Figure 3:
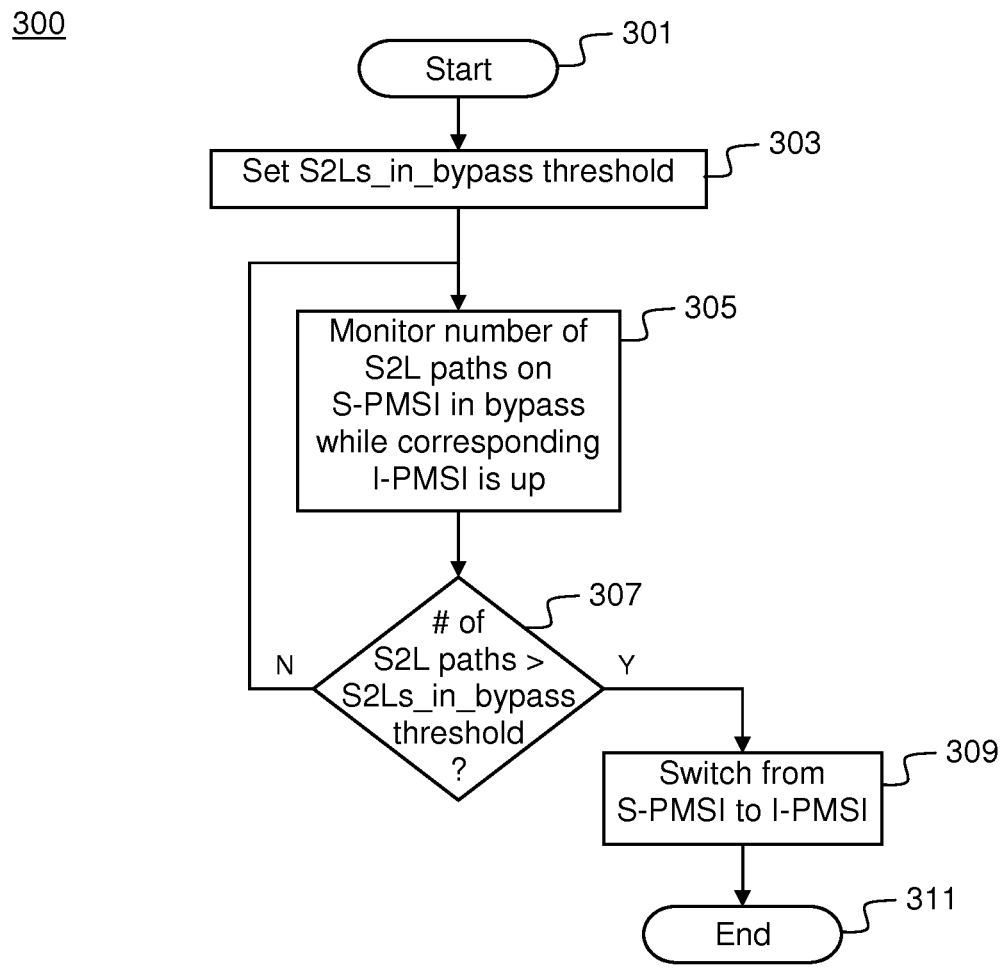
FIG. 3 illustrates a flow diagram of a method according to another embodiment.

FIG. 3 illustrates a flow diagram of a method according to another embodiment. Specifically, FIG. 3 depicts a method for execution by a network device such as a PE-LSR or PE router for controlling the switchover from S-PMSI to I-PMSI, using configurable thresholds. The method starts a step 301, in the situation where the S-PMSI tunnel is active for a given multicast flow active and while the corresponding I-PMSI for the multicast flow is up.

At step 303, the network device sets a third configurable threshold "S2Ls_in_bypass" for controlling the switchover from S-PMSI to I-PMSI, and which represents a threshold of a number of S2L paths that have switched from the main S2L tunnel to a bypass tunnel (as a result of a network event, such as a port failure, for example). This configurable threshold can be set through provisioning tools such as an Operations, Administration and Maintenance (OAM) tool or through a user interface, or pre-populated through software configuration.

At step 305, the network device monitors the number of S2L paths on the S-PMSI tunnel that are in bypass mode, such that there are no longer Quality of Service (QoS) guarantees for the multicast flow for the S2L paths in bypass.

At step 307, the network device determines if the number of S2L paths that have switched from the main S2L tunnel to a bypass tunnel exceeds the "S2Ls_in_bypass" threshold and if so then at step 309, the network device switches the multicast flow from S-PMSI to I-PMSI and starts using the I-PMSI tunnel. The network can then tear down the S-PMSI tunnel. The process ends at step 311.

If at step 307, the network device determines that the threshold has not been exceeded, then the process continues monitoring the number of S2L paths in bypass.

Figure 4:
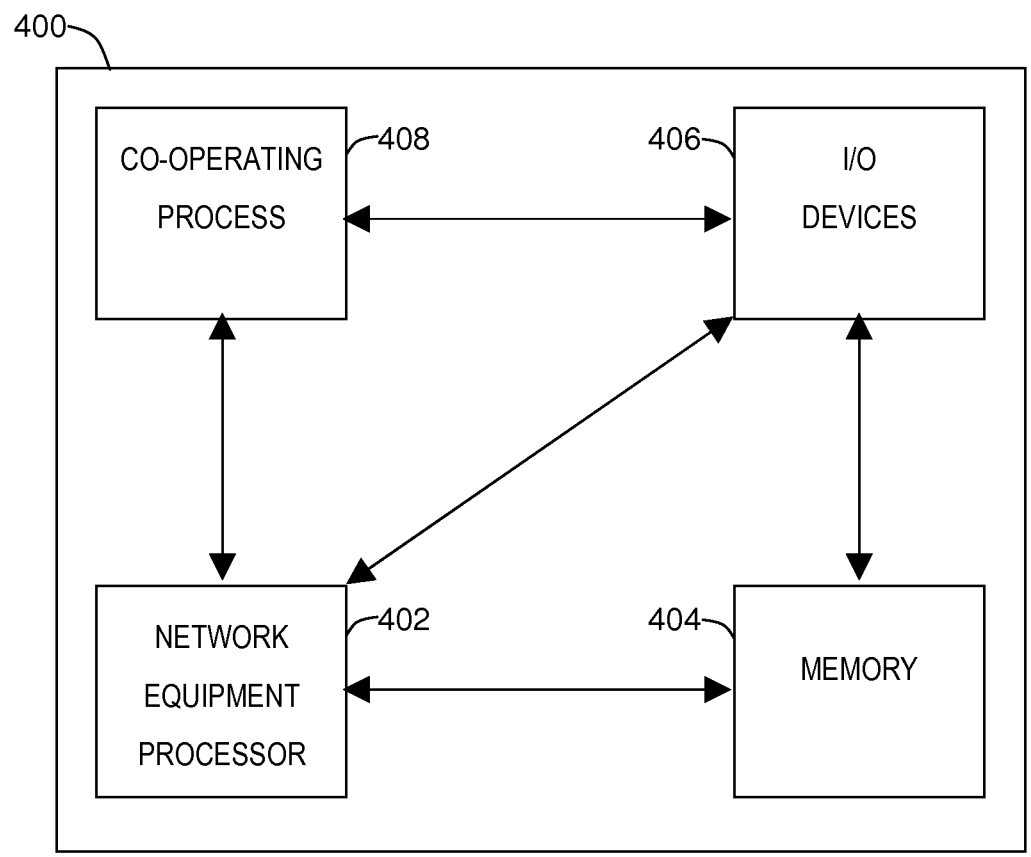
FIG. 4 illustrates a high-level block diagram of a computer suitable for use in performing the functions described herein. In the figures, like features are denoted by like reference characters.

As depicted in FIG. 4, network equipment processor assembly 400 includes a network equipment processor element 402 (e.g., a central processing unit (CPU) and/or other suitable processor(s)), a memory 404 (e.g., random access memory (RAM), read only memory (ROM), and the like), a cooperating module/process 408, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 408 can be loaded into memory 404 and executed by network equipment processor 402 to implement the functions as discussed herein. As well, cooperating process 408 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, configure the operation of the network equipment processor 402 such that the methods and/or techniques described herein are invoked or otherwise provided. Instructions for invoking the inventive methods may be stored in fixed or removable media, and/or stored within a memory within a computing device operating according to the instructions.

Generally speaking, computer hardware, software and/or firmware of the general architecture discussed herein may be replicated and used at each of a plurality of nodes or network elements or network management elements associated with a network. Moreover, such computer hardware, software and/or firmware at various locations, nodes, network elements or network management system elements may be operably communicating with each other to achieve the various steps, protocols, interactions and so on contemplated herein.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, a network equipment processor, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown. Numerous modifications, variations and adaptations may be made to the embodiment of the invention described above without departing from the scope of the invention, which is defined in the claims.

What is claimed is:

1. A method performed by a network device for management of an Inclusive Provider Multicast Service Interface (I-PMSI) tunnel configured to forward traffic for a multicast flow, the method comprising:
    defining a first threshold of a number of Source-to-Leaf (S2L) paths;
    receiving an expiry indication of an interval timer;
    determining a number of active S2L paths within said I-PMSI tunnel; and
    upon receiving said indication, determining if said number of active S2L paths exceeds said first threshold, wherein the first threshold is greater than one;
    if said number of active S2L paths exceeds said first threshold, then switching said multicast flow from said I-PMSI tunnel to a Selective Provider Multicast Service Interface (S-PMSI) tunnel; and
    if said number of active S2L paths does not exceed said first threshold, then resetting said interval timer, wherein said number of active S2L paths and said first threshold represent numbers relative to a total number of S2L paths within said I-PMSI tunnel.

2. The method of claim 1, wherein said network device comprises a Provider Edge Label Switch Router (PE-LSR).

3. The method of claim 1, wherein said S2L paths comprise S2L Label Switched Paths (LSPs).

4. The method of claim 1, further comprising:
    defining a second threshold of a number of Provider Edge (PE) nodes;
    determining the number of PE nodes associated with said S-PMSI tunnel;
    determining if said number of PE nodes exceeds said second threshold;
    if said number of PE nodes does not exceed said second threshold, then switching said multicast flow from said I-PMSI tunnel to said S-PMSI tunnel; and
    if said number of PE nodes exceeds said second threshold, then not switching said multicast flow from said I-PMSI tunnel to said S-PMSI tunnel but instead, tearing down said S-PMSI tunnel.

5. The method of claim 4, wherein said number of PE nodes and said second threshold represent numbers relative to a total number of PE nodes associated with said S-PMSI tunnel.

6. The method of claim 4, in the case of said S-PMSI tunnel being active, further comprising:
    defining a third threshold of a number of S2Ls in bypass;
    monitoring the number of S2L paths on S-PMSI in bypass while said I-PMSI is up; and
    switching said multicast flow from said S-PMSI tunnel to said I-PMSI tunnel if said number of S2L paths on S-PMSI in bypass exceeds said third threshold.

7. A network device for handling multicast flows, the device comprising:
    a network interface; and
    a processor, coupled to a memory, in communication with the network interface, wherein the processor is configured to define a first threshold of a number of Source-to-Leaf (S2L) paths, wherein the first threshold is greater than one, receive an expiry indication of an interval timer, determine a number of active S2L paths within an Inclusive Provider Multicast Service Interface (I-PMSI) tunnel, determine if said number of active S2L paths exceeds said first threshold, if said number of active S2L paths exceeds said first threshold, then switch said multicast flow from said I-PMSI tunnel to a Selective Provider Multicast Service Interface (S-PMSI) tunnel, if said number of active S2L paths does not exceed said first threshold, then reset said interval timer, wherein said number of active S2L paths and said first threshold represent numbers relative to a total number of S2L paths within said I-PMSI tunnel.

8. The network device of claim 7, wherein said network device comprises a Provider Edge Label Switch Router (PE-LSR).

9. The network device of claim 7, further configured to define a second threshold of a number of Provider Edge (PE) nodes, determine the number of PE nodes associated with said S-PMSI tunnel, determine if said number of PE nodes exceeds said second threshold, if said number of PE nodes does not exceed said second threshold, then switch said multicast flow from said I-PMSI tunnel to said S-PMSI tunnel; and if said number of PE nodes exceeds said second threshold, then not switch said multicast flow from said I-PMSI tunnel to said S-PMSI tunnel but instead, tear down said S-PMSI tunnel.

10. The network device of claim 9, wherein said number of PE nodes and said second threshold represent numbers relative to a total number of PE nodes associated with said S-PMSI tunnel.

11. The network device of claim 9, in the case of said S-PMSI tunnel being active, further configured to define a third threshold of a number of S2Ls in bypass, monitor the number of S2L paths on S-PMSI in bypass while said I-PMSI is up, and switch said multicast flow from said S-PMSI tunnel to said I-PMSI tunnel if said number of S2L paths on S-PMSI in bypass exceeds said third threshold.

12. A tangible and non-transitory machine-readable storage medium encoded with instructions thereon for execution by a network device, wherein the tangible and non-transitory machine-readable storage medium comprises:
instructions for defining a first threshold of a number of Source-to-Leaf (S2L) paths, wherein the first threshold is greater than one;
instructions for receiving an expiry indication of an expiry timer;
instructions for determining a number of active S2L paths within an Inclusive Provider Multicast Service Interface (I-PMSI) tunnel;
upon receiving said indication, instructions for determining if said number of active S2L paths exceeds said first threshold;
if said number of active S2L paths exceeds said first threshold then instructions for switching said multicast flow from said I-PMSI tunnel to a Selective Provider Multicast Service Interface (S-PMSI) tunnel;
if said number of active S2L paths does not exceed said first threshold, then instructions for resetting said interval timer, wherein said number of active S2L paths and said first threshold represent numbers relative to a total number of S2L paths within said I-PMSI tunnel.

13. The tangible and non-transitory machine-readable storage medium of claim 12, wherein said network device comprises a Provider Edge Label Switch Router (PE-LSR).

14. The tangible and non-transitory machine-readable storage medium of claim 12, wherein said S2L paths comprise S2L Label Switched Paths (LSPs).

15. The tangible and non-transitory machine-readable storage medium of claim 12, further comprising:
instructions for defining a second threshold of a number of Provider Edge (PE) nodes;
instructions for determining the number of PE nodes associated with said S-PMSI tunnel;
instructions for determining if said number of PE nodes exceeds said second threshold;
if said number of PE nodes does not exceed said second threshold, then instructions for switching said multicast flow from said I-PMSI tunnel to said S-PMSI tunnel; and
if said number of PE nodes exceeds said second threshold, then not switching said multicast flow from said I-PMSI tunnel to said S-PMSI tunnel but instead, instructions for tearing down said S-PMSI tunnel.

16. The tangible and non-transitory machine-readable storage medium of claim 15, wherein said number of PE nodes and said second threshold represent numbers relative to a total number of PE nodes associated with said S-PMSI tunnel.

17. The tangible and non-transitory machine-readable storage medium of claim 15, in the case of said S-PMSI tunnel being active, further comprising:
instructions for defining a third threshold of a number of S2Ls in bypass;
instructions for monitoring the number of S2L paths on S-PMSI in bypass while said I-PMSI is up; and
instructions for switching said multicast flow from said S-PMSI tunnel to said I-PMSI tunnel if said number of S2L paths on S-PMSI in bypass exceeds said third threshold.

* * * * *